US007282533B2

(12) United States Patent
Kreitschmann et al.

(10) Patent No.: US 7,282,533 B2
(45) Date of Patent: Oct. 16, 2007

(54) PLASTIC, PARTICULARLY A STERICALLY HINDERED ESTERIFIED AMINE CONTAINING POLYURETHANE

(75) Inventors: Mirko Kreitschmann, Aachen (DE); Hauke Malz, Diepholz (DE); Thomas Flug, Wagenfeld (DE); Sylvia Rybicki, Ostercappeln (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/567,083

(22) PCT Filed: Jul. 15, 2004

(86) PCT No.: PCT/EP2004/007876

§ 371 (c)(1),
(2), (4) Date: Feb. 3, 2006

(87) PCT Pub. No.: WO2005/017019

PCT Pub. Date: Feb. 24, 2005

(65) Prior Publication Data
US 2006/0189727 A1    Aug. 24, 2006

(30) Foreign Application Priority Data
Aug. 8, 2003    (DE) .................. 103 36 883

(51) Int. Cl.
*C08J 3/00* (2006.01)
*C08K 3/20* (2006.01)
*C08K 5/34* (2006.01)
*C08L 75/00* (2006.01)

(52) U.S. Cl. .................. 524/590; 524/589; 524/591; 524/839; 524/840; 524/99; 524/102; 524/871

(58) Field of Classification Search ................ 524/589, 524/590, 591, 839, 840, 99, 102, 871
See application file for complete search history.

(56) References Cited

U.S. PATENT DOCUMENTS

| | | | |
|---|---|---|---|
| 5,789,528 A * | 8/1998 | Martl et al. .................. 528/279 |
| 5,824,738 A | 10/1998 | Humphrey et al. | |
| 6,518,389 B1 | 2/2003 | Kaufhold et al. | |
| 2001/0053841 A1* | 12/2001 | Kaufhold et al. ............. 528/48 |
| 2003/0055158 A1* | 3/2003 | Konig et al. ................ 524/589 |

FOREIGN PATENT DOCUMENTS

| | | |
|---|---|---|
| DE | 101 48 702 | 4/2003 |
| EP | 0293253 A1 * | 11/1988 |
| JP | 2003-192783 A * | 7/2003 |

OTHER PUBLICATIONS

Zweifel Hans: Plastics Additives Handbook, 5th ed., Hanser Publishers, pp. 98 to 136, 2001.

* cited by examiner

*Primary Examiner*—Patrick Niland
(74) *Attorney, Agent, or Firm*—Oblon, Spivak, McClelland, Maier & Neustadt, P.C.

(57) ABSTRACT

Plastics comprise sterically hindered, esterified amine (I) which contains less than 100 ppm, based on the weight of (I), of titanium.

20 Claims, No Drawings

the general prior art. For example, plastics can be protected

PLASTIC, PARTICULARLY A STERICALLY HINDERED ESTERIFIED AMINE CONTAINING POLYURETHANE

The present invention relates to plastics, for example crosslinked plastics or thermoplastics, for example polyolefins, e.g. PE, PP, polystyrene, styrene copolymers, polyoxymethylene, polycarbonate, polyesters, e.g. PET, PBT, polyamides, polyacrylates, in particular polyurethane, for example generally known compact or foamed, flexible or rigid polyurethane, which may have urea and/or isocyanurate structures, particularly preferably thermoplastic polyurethane comprising sterically hindered, esterified amine (I) which contains less than 100 ppm, preferably less than 30 ppm, particularly preferably from 0 to 5 ppm, based on the weight of (I), of titanium. Preferably, the plastic contains less than 100 ppm, preferably less than 30 ppm, particularly preferably from 0 to 5 ppm, based on the weight of (I), of titanium altogether. Moreover, the present invention relates to processes for the preparation of polyurethanes, in particular by generally known reaction of (a) isocyanates with (b) compounds reactive toward isocyanates and comprising sterically hindered, esterified amine (I), a sterically hindered esterified amine (I) containing less than 100 ppm, preferably less than 30 ppm, particularly preferably from 0 to 5 ppm, based on the weight of (I), of titanium being added to the polyurethane during the preparation, for example by adding (I) to the starting components for the preparation of the polyurethane, or after the preparation.

Plastics, for example polyolefins, polyamides, polyurethanes, polyacrylates, polycarbonates, polyesters, polyoxymethylenes, polystyrenes and styrene copolymers, are used in many areas of daily life. Examples of these applications are films and fibers, automotive applications in the interior, such as upholstery and covering materials, dashboard or airbag, or in the exterior region of automobiles in the case of tires, bumpers or protective strips, and furthermore cable sheaths, housings, shoe soles, dispersions, finishes or surface coatings.

Thermoplastics are plastics which, when they are repeatedly heated and cooled in the temperature range typical for processing and use of the material, remain thermoplastic. Thermoplastic is understood as meaning the property of a plastic to soften repeatedly under heat in a temperature range typical for it and to harden on cooling and, in the softened state, to be capable of being repeatedly shaped by flow as a molding, extrudate or thermoformed part to give a semifinished product or articles. Thermoplastics are widely used in industry and are present in the form of sheets, films, moldings, bottles, sheaths, packagings, etc.

In these different applications, the plastics are subject to a very wide range of requirements. For example, plastics which are used in the engine. space of a motor vehicle must withstand high temperatures. On the other hand, plastics films or finishes which are exposed to sunlight are subject to the harmful influence of UV light. UV light and thermal load generally lead to discoloration of the product or to a reduction of the property level of the plastic. This in turn impairs the visual appearance of the product. Moreover, the mechanical properties of the product may noticeably decline so that the product can no longer be used in the desired sense.

Owing to their different chemical compositions, plastics have different stabilities to UV light and thermal damage or to damage by environmental influences generally. Nevertheless, it would be desirable to make the range of use of all plastics as broad as possible, i.e. to increase the stability of the plastic to environment-related damage, for example by heat, sunlight or UV light.

The protection of plastics with stabilizers is part of the general prior art. For example, plastics can be protected from UV damage by a mixture of an antioxidant (AO) and a hindered amine light stabilizer (HALS) or by a mixture of a UV absorber and a phenolic antioxidant or by a mixture of phenolic antioxidant, an HALS and a UV absorber. Owing to the substantial property improvements in the case of plastics, which are achieved by the addition of stabilizing additives, a confusingly large number of different stabilizers and stabilizer combinations is now commercially available. Examples of such compounds are given in Plastics Additive Handbook, 5th Edition, H. Zweifel, ed., Hanser Publishers, Munich, 2001 ([1]), pages 98-136.

One problem of stabilizers is their migration behavior, i.e. their volatility and their tendency to bloom, bleed or wash out. For example, it has been found that stabilizers whose molar mass is too low evaporate from the plastic, which is then unprotected and is therefore damaged by environmental influences, such as high temperature or heat. This is a relevant problem particularly when the surface/volume ratio is very large. In particular applications, for example in the interior region of automobiles, the evaporation of the stabilizer, i.e. fogging, can result in user limits with regard to the total amount of volatile components being exceeded and the plastic thus being rejected. In order to avoid volatility, stabilizers are usually oligomerized, polymerized or bound to an organic anchor group in order to increase the molar mass. An organic anchor group in this context is an organic radical whose task is to increase the molar mass of the stabilizer. One or more stabilizers can be bound to such an anchor group.

By increasing the molar mass, however, the compatibility of the stabilizer with the polymer may decline so that blooming, i.e. the formation of deposits of the stabilizer on the surface of the product, occurs. These deposits lead to a visual impairment of the product and can therefore result in complaints. Moreover, the concentration of the stabilizer and hence the efficiency of the stabilizer mixture are reduced by the blooming. Particularly in the case of thick workpieces having a low surface/volume ratio, blooming is a relevant problem.

The incompatibility of a stabilizer with a polymer and hence the risk of blooming of the stabilizer is greatly dependent on the stabilizer/polymer pair and is unforeseeable. Sometimes, a stabilizer which can be used without problems in one polymer may lead to considerable blooming in another polymer. Consequently, not only must a manufacturer of different plastics stock a large number of different stabilizers having in some cases the same active groups, but also the tests for finding the optimum stabilizers become very expensive since the migration properties as well have to be investigated anew for each polymer.

Polyurethane, in particular thermoplastic polyurethane (referred to below as TPU) is an elastomer which is used in many applications, for example shoe applications, films, ski boots, hoses, instrument panels, seals, heel patches, decorative and design elements, ski-covering films, protective films for traffic signs, etc. In many of these applications, the TPU is exposed directly or indirectly to UV light. For this reason, the protection of the TPU by UV stabilizers or mixtures of UV stabilizers is part of the prior art. For example, antioxidants, in particular phenolic antioxidants, may be used. Examples of phenolic antioxidants are to be found in Plastics Additive Handbook, 5th edition, H. Zweifel, ed, Hanser Publishers, Munich, 2001 ([1]), pages 98-107 and pages 116-121. Furthermore, UV absorbers may also be used for protecting the TPU. UV absorbers are molecules which absorb high-energy UV light and dissipate energy. Conventional UV absorbers which are used in industry belong, for example, to the group consisting of the cinnamic esters, the diphenylcyanoacrylates, diarylbutadienes and the benzotriazoles. The benzotriazoles are particularly suitable.

A further class of UV stabilizers comprises the sterically hindered amines, also known as hindered amine light stabilizers (HALS). The activity of the HALS is based on their ability to form nitroxyl radicals, which intervene in the mechanism of the oxidation of polymers. HALS are considered to be efficient UV stabilizers for most polymers and hence also for polyurethanes. Examples of hindered amine light stabilizers are given in [1], pages 123-136. Owing to its low volatility and its good compatibility with the TPU, Tinuvin® 622 (Ciba Specialty Chemicals, Basel, Switzerland) is particularly suitable for polyurethane.

In general, the stabilizers described above are used as mixtures. For example, UV absorbers can be combined with phenolic stabilizers or UV absorbers with with HALS compounds, HALS compounds with phenolic stabilizers and also combinations of HALS, UV absorbers and phenolic stabilizers are possible.

Usually, thermoplastic polyurethanes are protected by a mixture of antioxidant, UV absorber and HALS. Thus, CIBA Speciality Chemicals recommends the use of Tinuvin® 622 with its UV absorbers of the Tinuvin® series [Tinuvin® 622, Technical Data Sheet, Nov-99].

U.S. Pat. No. 5,824,738 describes the use of such a mixture of antioxidant, UV absorber and HALS for stabilizing thermoplastic polyurethane. A mixture of phenolic stabilizer, benzotriazole and Tinuvin® 622 has proven particularly suitable.

However, it has been found that in particular stabilizer mixtures for UV stabilization which comprise a benzotriazole as a UV absorber tend to cause yellowing of the polyurethanes to be stabilized even before exposure to light. This yellowing, as little as it may be, is undesirable and leads to rejection of the product.

DE 10148702 A1 describes a stabilizer mixture comprising antioxidant, UV absorber, HALS and additionally a phosphite in order to keep the initial color of the TPU as faint as possible. Examples of phosphites are to be found in [1], pages 109-112. However, phosphites have a hydrolyzing effect, particularly in the case of polyester-TPU. This hydrolysis leads to a deterioration in the mechanical properties and hence to a deterioration of the product.

It is an object of the present invention to provide a plastic, particularly preferably a polyurethane, in particular a TPU, which has a very faint intrinsic color and moreover is excellently stabilized to external influences, in particular to UV radiation. Particularly preferably, the polyurethane should also have high stability to hydrolysis.

We have found that this object is achieved by the plastic described at the outset, in particular the polyurethane.

Surprisingly, it has been found that esterified sterically hindered amine which was freed from residues of titanium-containing catalysts leads to substantially less yellowing of the polyurethane. In this context, freed means that titanium catalyst residues were deactivated, complexed, precipitated, filtered, absorbed or rendered harmless in another manner, or that no titanium was used as a catalyst during the esterification of the sterically hindered amine.

The novel, sterically hindered and esterified amine is preferably Tinuvin® 622 (CAS No: 65447-77-0), which is denoted by 3 in the following scheme. Preferably, it is therefore a condensate based on a sterically hindered amine comprising 2 hydroxyl groups (denoted by 1 in the scheme) and butanedioic acid or a butanedioic acid derivative (denoted by 2). Condensations take place in general with elimination of an OH-containing compound. This may be water or an alcohol, preferably a low molecular weight alcohol, such as methanol or ethanol. By removing the OH component from the equilibrium, for example by distillation, the reaction can be driven in the direction of the polycondensate. In order to accelerate the reaction, catalysts, such as tin or titanium catalysts, are used. The titanium catalysts are particularly reactive. The hydroxyl group in the 4-position of the ring of 1 is a secondary OH group. Secondary OH groups are less reactive than primary OH groups in polycondensation reactions. High concentrations of catalysts, in particular of titanium catalysts, are therefore frequently used. These catalysts are generally no longer filtered off after the reaction and thus remain in the product. Thus, the esterified sterically hindered amine 3 of different manufacturers comprises from 120 to 200 ppm of titanium.

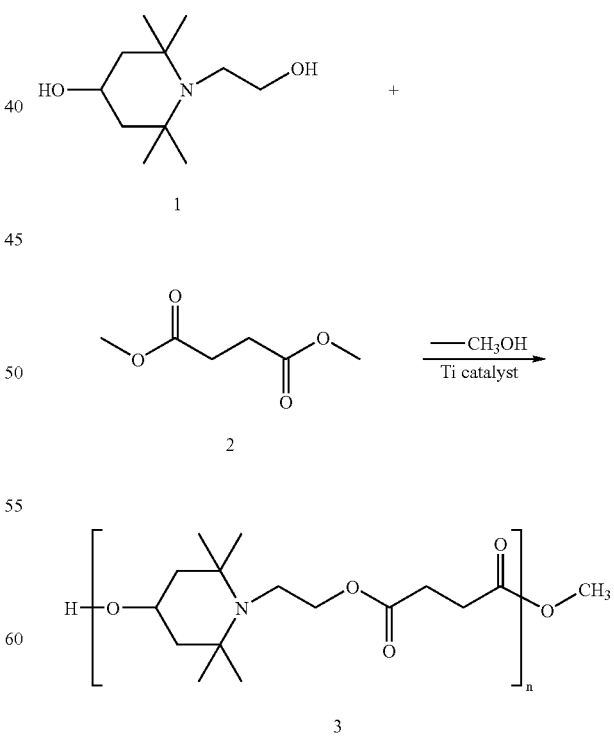

Surprisingly, it has been found that this titanium is responsible for the discoloration of a UV-stabilized TPU during the synthesis. According to the invention, a sterically hindered esterified amine, in particular that of the formula 3 shown above, having a titanium content of <100 ppm, preferably <30 ppm, in particular <5 ppm, based in each case on the weight of the sterically hindered esterified amine, is therefore used in the novel polyurethane, in particular the thermoplastic polyurethane.

Surprisingly, it has also been found that the hydrolysis of the TPU is reduced if a novel, sterically hindered esterified amine is used.

A polyurethane, in particular TPU, which, as (I), comprises the following compound is therefore preferred:

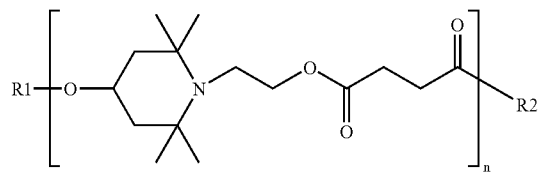

where n is an integer from 1 to 100, preferably from 3 to 50, in particular from 8 to 14, R1 is a hydrogen atom or straight-chain, branched or cyclic alkyl of 1 to 12 carbon atoms, preferably a hydrogen atom, R2 is a hydrogen atom or straight-chain, branched or cyclic alkyl of 1 to 12 carbon atoms or is R1 or O—R1 or N(R1)$_2$, preferably —O—CH$_3$.

The low content of titanium can preferably be achieved by esterifying, i.e. preparing, the sterically hindered, esterified amine in the presence of titanium catalysts and then removing the titanium catalyst, for example by filtration. For this purpose, for example, the product can be taken up in a solvent for reducing the viscosity, stirred in the presence of a small amount of water, for example from 0.01 to 10, preferably from 0.1 to 3, in particular from 0.1 to 1, % by weight, and then filtered. Pressure filtration is preferably used for the filtration.

The novel polyurethane preferably comprises a phenolic stabilizer (II) in addition to (I).

Suitable phenolic stabilizers are generally known compounds which in particular act as antioxidants. In a preferred embodiment, the antioxidants (II), in particular the phenolic antioxidants (II), have a molar mass greater than 350, particularly preferably greater than 700, g/mol and a maximum molar mass of <10 000, preferably <3 000, in particular <1 500, g/mol. Furthermore, they preferably have a melting point of less than 180° C. Moreover, antioxidants which are amorphous or liquid are preferably used. Mixtures of two or more antioxidants can also be used as component (II).

The abovementioned boundary conditions regarding molar mass and melting point ensure that the antioxidant does not volatilize even in the case of large surface/volume ratios and that the antioxidant can be incorporated uniformly and homogeneously into the TPU during the synthesis. Examples of suitable phenolic antioxidants are molecules which comprise the following structure 1 as an active group:

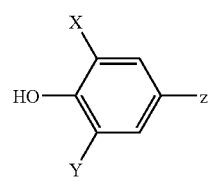

where

X and Y, independently of one another, are a hydrogen atom or straight-chain, branched or cyclic alkyl of 1 to 12 carbon atoms and Z is a covalent bond via which the active group is bonded to the remaining molecule of the antioxidant (i).

Preferably used phenolic antioxidants (II) are those compounds which comprise the following radical 2:

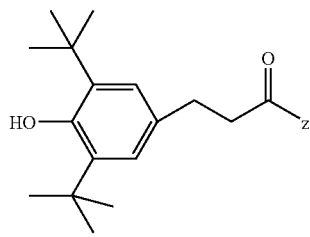

where Z is defined as above for 1.

Examples of preferred phenolic antioxidants which comprise the active group 1 are triethylene glycol bis(3-(5-tert-butyl-4-hydroxy-m-tolyl)-propionate) (Irganox® 245, Ciba Spezialitätenchemie AG), hexamethylene bis(3-(3,5-di-tert-butyl-4-hydroxyphenyl)propionate) (Irganox® 259), pentaerythrityl tetrakis(3-(3,5-bis(1,1-dimethylethyl)-4-hydroxyphenyl)propionate) (Irganox® 1010), octadecyl-3-(3,5-di-tert-butyl-4-hydroxyphenyl)propionate (Irganox® 1076), N,N'-hexamethylenebis(3,5-di-tert-butyl-4-hydroxyhydrocinnamide) (Irganox® 1098) and Irganox® 1135.

Antioxidants which can be described by the general formulae 3A and 3B are particularly preferred.

Particularly preferably, the polyurethane comprises, as phenolic stabilizer (II), one of the following compounds 3A and 3B:

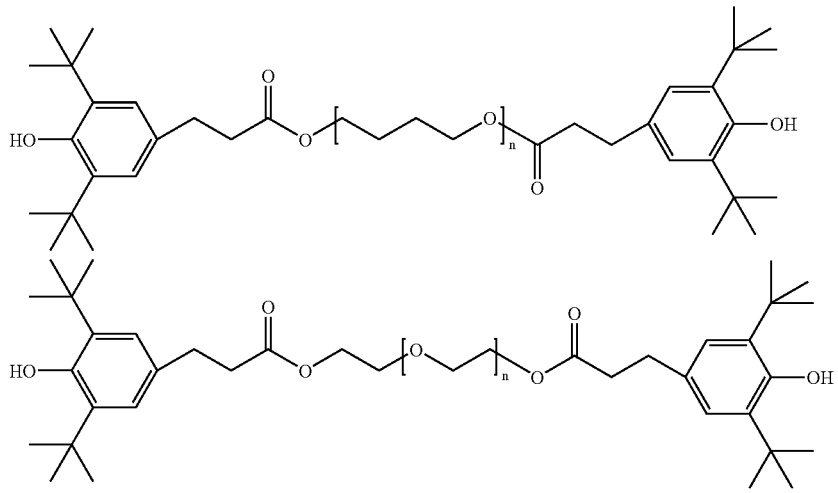

in each case having the following meanings for n: 1-30, preferably 1, 2, 3, 4, 5, 6, 7, 8, 9, 10, 11, 12, 13, 14, 15, 16, 17, 18, 19, 20, 21, 22, 23, 24, 25, particularly preferably 2, 3, 4, 5, 6, 7, 8 or 9, in particular 3, 4 or 5.

Mixtures comprising compounds of the formulae 3A and/or 3B which differ in the respective n and thus have different molecular weights are particularly preferred.

The preferred antioxidants 3A and 3B are accordingly preferred mixtures of different compounds which differ only in the magnitude of n and are referred to below as antioxidant mixture. The proportion of the molecules $n_1$, $n_2$, $n_3$ to $n_m$ is preferably chosen so that the number average molar mass of the antioxidant mixture corresponds to the molar mass recognized as being advantageous. Preferably, the proportion of the molecules $n_1$, $n_2$, $n_3$ to $n_m$ is chosen so that the number average molar mass of the antioxidant mixture 3A and/or 3B is greater than 350, particularly preferably >700, g/mol and <10 000, preferably <3 000, in particular <1 000, g/mol.

In a further preferred embodiment, antioxidant mixtures whose polydispersity $P_d$ is greater than 1 are preferably used, i.e. their number average molar mass is less than their weight average molar mass. This is fulfilled, for example, when the antioxidant consists of a mixture of different molecules of the structure 3A or 3B having different n.

It may be advantageous to use mixtures of phenolic antioxidants for stabilization instead of a single phenolic antioxidant. In principle, all phenolic antioxidants which comply with the conditions described above and relating to molar mass and melting point can be used for such mixtures.

Mixtures which comprise Irganox® 1010 and/or those mixtures which comprise phenolic antioxidants according to the formulae 3A and 3B are particularly preferred.

The novel polyurethanes preferably also comprise at least one benzotriazole (III), which serves as a UV-A absorber, in addition to (I). UV-A absorbers are those molecules which absorb light having a wavelength in the UV-A spectrum and convert it into a form which is not harmful for the plastic, e.g. heat.

Examples of commercially available and preferred benzotriazoles are Tinuvin®P (CAS Reg. No. 2440-22-4), Tinuvin® 329 (CAS Reg. No. 3147-75-9), Tinuvin® 326 (CAS Reg. No. 3896-11-5), Tinuvin® 320 (CAS Reg. No. 3846-71-7), Tinuvin® 571 (CAS Reg. No. 23328-53-2), Tinuvin® 328 (CAS Reg. No. 25973-55-1), Tinuvin® 350 (CAS Reg. No. 36437-37-3), Tinuvin® 327 (CAS Reg. No. 3864-99-1), Tinuvin® 234 (CAS Reg. No. 70321-86-7), Tinuvin® 360 (CAS Reg. No. 103597-45-1), Tinuvin® 840 (CAS Reg. No. 84268-08-6), C7-9 branched and linear alkyl ester of 4-hydroxy-3-(2H-benzotriazol-2-yl)-5-(1,1-dimethylethyl)phenylpropanoic acid (CAS No. 127519-17-9), Tinuvin® 384, Tinuvin® 213 (mixture of 3 substances with CAS No. 104810-48-2, 10481047-1, 25322-68-3). Tinuvin® is a trade mark of CIBA Specialty Chemicals, Basel, Switzerland.

Tinuvin® 328, Tinuvin® 329, Tinuvin® 234, Tinuvin® 213, Tinuvin® 571 and Tinuvin are particularly preferred. Tinuvin 328®, Tinuvin® 571, Tinuvin® 213 and Tinuvin® 384, are particularly preferred, in particular C7-9 branched and linear alkyl ester of 4-hydroxy-3-(2H-benzotriazol-2-yl)-5-(1,1-dimethylethyl)phenylpropanoic acid (CAS No. 127519-17-9), Tinuvin® 384 and Tinuvin® 328.

Mixtures of two or more of said UV absorbers (III) can also be used as component (III) of the novel stabilizer mixture.

Processes for the preparation of polyurethanes, in particular of TPUs, are generally known. For example, polyurethanes, preferably TPUs, can be prepared by reacting (a) isocyanates with (b) compounds reactive toward isocyanates and having a molecular weight of from 500 to 10 000 and, if appropriate, (c) chain extenders having a molecular weight of from 50 to 499, if appropriate in the presence of (d) catalysts and/or (e) conventional assistants and/or additives.

The starting components and processes for the preparation of the preferred polyurethanes are to be described below by way of example. The components (a), (b) and, if appropriate, (c), (d) and/or (e) usually used in the preparation of the polyurethanes are to be described below by way of example:

a) Organic isocyanates (a) which may be used are generally known aliphatic, cycloaliphatic, araliphatic and/or aromatic isocyanates, preferably diisocyanates, for example tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), toluene 2,4- and/or 2,6-diisocyanate (TDI), diphenylmethane diisocyanate, 3,3'-dimethylbiphenyl diisocyanate, 1,2-diphenylethane diisocyanate and/or phenylene diisocyanate.

b) The generally known compounds reactive toward isocyanates may be used as compounds (b) reactive toward isocyanates, for example polyesterols, polyetherols and/or polycarbonatediols, which are usually also summarized by the term polyols, having molecular weights of from 500 to 8 000, preferably from 600 to 6 000, in particular from 800 to 4 000, and preferably an average functionality of from 1.8 to 2.3, preferably from 1.9 to 2.2, in particular 2 c) Chain extenders (c) which may be used are generally known aliphatic, araliphatic, aromatic and/or cycloaliphatic compounds having a molecular weight of from 50 to 499, preferably difunctional compounds, for example diamines and/or alkanediols having 2 to 10 carbon atoms in the alkylene radical, in particular 1,4-butanediol, 1,6-hexanediol and/or di-, tri-, tetra-, penta-, hexa-, hepta-, octa-, nona- and/or decaalkylene glycols of 3 to 8 carbon atoms, preferably corresponding oligo- and/or polypropylene glycols, it also being possible to use mixtures of the chain extenders.

d) Suitable catalysts which in particular accelerate the reaction between the NCO groups of the diisocyanates (a) and the hydroxyl groups of components (b) and (c) are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and in particular organic metal compounds, such as titanic esters, iron compounds, e.g. iron(III) acetylacetonate, tin compounds, e.g. tin diacetate, tin dioctanoate, tin dilaurate or the dialkyltin salts of aliphatic carboxylic acids, such as dibutyltin diacetate, dibutyltin dilaurate or the like. The catalysts are usually used in amounts of from 0.0001 to 0.1 part by weight per 100 parts by weight of polyhydroxy compound (b).

e) In addition to catalysts (d), conventional assistants and/or additives (e) may also be added to the components (a) to (c). Examples are blowing agents, surface-active substances, fillers, flameproofing agents, nucleating agents, antioxidants, lubricants and mold release agents, dyes and pigments, if appropriate further stabilizers, for example hydrolysis stabilizers, light stabilizers, heat stabilizers or stabilizers to prevent discoloration, in addition to the novel stabilizer mixture, inorganic and/or organic fillers, reinforcing agents and plasticizers. In a preferred embodiment, component (e) also includes hydrolysis stabilizers, for example polymeric and low molecular weight carbodiimides. In a further embodiment, the TPU may comprise a phosphorus compound. In a preferred embodiment, phosphorus compounds used are organophosphorus compounds of trivalent phosphorus, such as phosphites and phosphonites. Examples of suitable phosphorus compounds are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, di(2,4-di-tert-butylphenyl) pentaerythrityl diphosphite, tristearyl sorbitol triphosphite, tetrakis(2,4-di-tert-butylphenyl) 4,4'-biphenylylene diphosphonite, Triisodecyl phosphite, diisodecyl phenyl phosphite and diphenyl isodecyl phosphite or mixtures thereof.

The phosphorus compounds are suitable particularly when they are difficult to hydrolyze, since hydrolysis of a phosphorus compound to the corresponding acid may lead to damage to the polyurethane, in particular the polyesterurethane. Accordingly, the phosphorus compounds which are particularly difficult to hydrolyze are specially suitable for polyesterurethanes. Examples of such phosphorus compounds are dipolypropylene glycol phenyl phosphite, triisodecyl phosphite, triphenyl monodecyl phosphite, triisononyl phosphite, tris(2,4-di-tert-butylphenyl) phosphite, tetrakis(2,4-di-tert-butylphenyl) 4,4'-biphenylylene diphosphonite and di(2,4-di-tert-butylphenyl) pentaerythrityl diphosphite or mixtures thereof.

In addition to said components a) and b) and, if appropriate, c), d) and e), chain regulators, usually having a molecular weight of from 31 to 499, may also be used. Such chain regulators are compounds which have only one functional group reactive toward isocyanates, for example monofunctional alcohols, monofunctional amines and/or monofunctional polyols. By means of such chain regulators, it is possible to establish a specific flow behavior, in particular in the case of TPUs. Chain regulators can be used in general in an amount of from 0 to 5 parts by weight, preferably from 0.1 to 1 part by weight, based on 100 parts by weight of the component b), and are by definition covered by component c).

All molecular weights stated in this document have the unit [g/mol].

For establishing the hardness of TPUs, the components (b) and (c) can be varied within relatively wide molar ratios. It has proven particularly useful if the molar ratios of component (b) to the total amount of chain extenders (c) to be used are from 10:1 to 1:10, in particular from 1:1 to 1:4, the hardness of the TPU increasing with increasing content of (c).

Chain extenders (c) are also preferably used for the preparation of TPU.

The reaction can be effected at conventional indices, preferably at an index of from 60 to 120, particularly preferably from 80 to 110. The index is defined by the ratio of the total amount of isocyanate groups of component (a) which are used in the reaction to the groups reactive toward isocyanates, i.e. the active hydrogens, of components, (b) and (c). At an index of 100, there is one active hydrogen atom, i.e. one function reactive toward isocyanates, of components (b) and (c) per isocyanate group of component (a). At indices above 100, more isocyanate groups than OH groups are present.

The preparation of the TPU can be carried out by known processes, continuously, for example using reaction extruders or the belt process according to the one-shot or the prepolymer method, or batchwise according to the known prepolymer process. In these processes, the components (a), (b) and, if appropriate (c), (d) and/or (e) to be reacted can be mixed with one another in succession or simultaneously, the reaction starting immediately.

In the extruder process, the components (a), (b) and, if appropriate (c), (d) and/or (e) are fed individually or as a mixture into the extruder and reacted, for example, at from 100 to 280° C., preferably from 140 to 250° C., and the TPU obtained is extruded, cooled and granulated.

The processing of the TPUs prepared according to the invention, which are usually present in the form of granules or in powder form, to give the desired films, shaped articles, rollers, fibers, claddings in automobiles, tubes, cable plugs, bellows, trailing cables, cable sheaths, seals, belts or damping elements is effected by conventional methods, for example injection molding or extrusion.

The stabilizer (I), i.e. the sterically hindered, esterified amine, is preferably present in the polyurethane in a concentration of from 0.1 to 5, particularly preferably from 0.1 to 3, in particular from 0.1 to 1, % by weight, based on the total weight of the polyurethane.

If the TPU to be stabilized is a polyether-TPU having a Shore hardness of less than Shore 54 D, the antioxidant (I) is usually used in concentrations of from 0.1 to 5, preferably from 0.1 to 1, particularly preferably from 0.5 to 1, % by weight, based on the total weight of the TPU.

If the TPU to be stabilized is a polyester-TPU or a polyether-TPU having a Shore hardness greater than or equal to Shore 54 D, the antioxidant (I) is usually used in concentrations of from 0.1 to 5, preferably from 0.1 to 1, particularly preferably from 0.15 to 0.5, % by weight, based on the total weight of the TPU.

The stabilizer (II), i.e. the phenolic stabilizer, is preferably contained in the polyurethane in a concentration of from 0.1 to 5% by weight, based on the total weight of the polyurethane.

The UV absorber (III), i.e. the benzotriazole, is preferably contained in the polyurethane in a concentration of from 0.01 to 2, particularly preferably from 0.05 to 1, in particular from 0.15 to 0.25, % by weight, based on the total weight of the polyurethane.

The expression total weight of the polyurethane is to be understood as meaning the weight of the polyurethane including if appropriate catalysts, assistants, fillers, stabilizers, etc. which may be present in the polyurethane and are not incorporated into the actual polyurethane polymer.

If the TPU is a polyester-TPU, a hydrolysis stabilizer is preferably also added. Preferred hydrolysis stabilizers are carbodiimides (IV), for example polymeric and low molecular weight carbodiimides. Hydrolysis stabilizers are used in general in a concentration of from 0.05 to 5, preferably from 0.2 to 2, in particular from 0.5 to 1, % by weight, based on the total weight of the TPU.

The polyurethanes, in particular the thermoplastic polyurethanes, therefore preferably also comprise the stabilizers (II) and/or (III), particularly preferably (II) and (III), in addition to the novel stabilizers (I).

For the preparation of the novel polyurethanes comprising the component (I) and preferably (II) or (III), particularly preferably (II) and (III) and, if appropriate, (IV), various processes are possible.

The three components (I) to (III) of the stabilizer mixture can be metered into the raw materials before the synthesis of the polyurethane, preferably if the components (I) to (III) are miscible with the starting materials of the polyurethane. For example, the components (I) to (III) can be added to the polyol component (b) or the isocyanate component (a). It is also possible to add different stabilizer components to different components for the preparation of the polyurethane. For example, the components (I) to (II) can be added to the polyol component (b), and the stabilizer component (III) to the isocyanate component (a).

The stabilizer components (I) to (III) can also be metered in during the synthesis of the polyurethanes, for example of the TPU. For example, the three stabilizer components (I), (II) and (III) can be metered individually into the starting material streams of the reactor or, if the TPU is prepared by a reaction extrusion process, directly into the extruder. The stabilizer components can also be premixed and then metered into the TPU.

Furthermore, the three components (I) to (III) of the novel stabilizer mixture can be added to the TPU only during the processing, for example during an extrusion or injection molding process. Here too, it is particularly advantageous if the four active components can be mixed prior to metering and then metered in as a finished premix.

Finally, the four components for the stabilization may also be incorporated in high concentration into a TPU. This concentrate is then granulated and is metered in as an additive during the processing of an unstabilized TPU.

The novel polyurethanes, in particular thermoplastic polyurethanes, are preferably used for the production of shaped articles, preferably films, shoe soles, rollers, fibers, claddings in automobiles, wiper blades, tubes, cable plugs, bellows, trailing cables, cable sheaths, seals, belts or damping elements, these having the advantages described at the outset.

EXAMPLES

Example 1

This example describes the average titanium content of the following compound from different manufacturers:

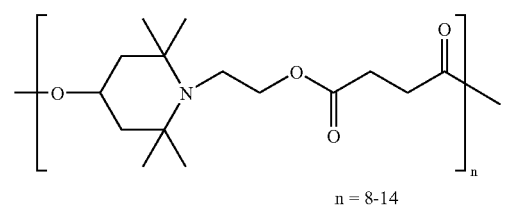

n = 8-14

The titanium content of Tinuvin® 622 LD and of the chemically identical products Chisorb® 622 LD and Lowilite® 62 was determined by means of atomic absorption spectroscopy.

| Trade name | Manufacturer | Titanium content in ppm |
| --- | --- | --- |
| Tinuvin ® 622 LD | CIBA | 110 |
| Chisorb ® 622 LD | Double Bond Chemical | 138 |
| Lowilite ® 62 | Great Lakes | 120 |

As is evident from table 1, all manufacturers use, for the synthesis, a titanium catalyst which remains in high concentration in the product.

Example 2

Process for Purifying Tinuvin® 622

100 g of Tinuvin® 622 were dissolved in 300 g of THF. Thereafter, 0.5% by weight, based on the total amount, of water was added with stirring and stirring was continued for 1 hour. The solution was then filtered through a pressure filter (Seitz one-sheet filter EDF 14-2) having a Seitz deep-bed filter disk T 120 at 1.5-2 bar. The solution was evaporated down in a rotary evaporator and the purified Tinuvin® 622 was dried at 10 mbar for 6 hours at 40° C.

Titanium content before purification: 110 ppm; titanium content after purification: 2.3 ppm

Example 3

Preparation of a Polyester-TPU 1 000 g of a polyesterol (LP 1010, BASF Aktiengesellschaft) were heated to 80° C. in a 2 l tinplate bucket. Various stabilizers were then added with stirring. Examples of the type and amount of the stabilizers are summarized in table 2. 88 g of 1,4-butanediol and 8 g of Elastostab® H 01 (Elastogran GmbH) were then added. After subsequent heating of the solution to 75° C., 500 g of 4,4'-MDI (methylenediphenyl diisocyanate) were added and stirring was continued until the solution was homogeneous. Thereafter, the reaction material was poured into a shallow dish and heated at 125° C. on a hotplate for 10 minutes. The resulting slab was then heated in a heating oven for 24 hours at 100° C. After granulation of the cast slabs, the granules were processed on an injection molding machine to give 2 mm injection molded sheets. The product had a Shore hardness of Shore 85A.

Example 4

Polyester-TPUs which were stabilized with a UV stabilization mixture were cast according to example 3. Table 2 provides information about the amount of stabilizers used.

TABLE 2

Concentration of the stabilizers in the polyester-TPUs, with different HALS products (Irganox is a registered trade name of CIBA Specialty Chemicals)

| Sample | Stabilizer 1 (0.25% by wt.) | Stabilizer 2 (0.25% by wt.) | Stabilizer 3 (0.15% by wt.) | Stabilizer 4 (0.25% by wt.) |
|---|---|---|---|---|
| 4-a | Irganox® 1010 | Irganox® 1098 | Tinuvin® 571 | Tinuvin® 622 |
| 4-b | Irganox® 1010 | Irganox® 1098 | Tinuvin® 571 | Tinuvin® 765 |
| 4-c | Irganox® 1010 | Irganox® 1098 | Tinuvin® 571 | ADK-STAB LA62 |

The 2 mm injection molded sheets produced from experiments 4b+4c had a smear film after storage for 5 weeks at room temperature. The injection molded sheets of experiment 4a on the other hand were free of deposits after storage for 5 weeks at room temperature.

Example 5

Preparation of an Ether-TPU 1 000 g of a polyetherol (PTHF1000, BASF Aktiengesellschaft) were heated to 80° C. in a 2 l tinplate bucket. The various stabilizers were then added with stirring. The type and amount of the stabilizers are summarized in table 3. 155 g of 1,4-butanediol were then added. After subsequent heating of the solution to 75° C., 830 g of 4,4'-MDI (methylenediphenyl diisocyanate) were added and stirring was continued until the solution was homogeneous. Thereafter, the reaction material was poured into a shallow dish and heated at 125° C. on a hotplate for 10 minutes. The resulting slab was then heated in a heating oven for 24 hours at 100° C. After granulation of the cast slabs, the granules were processed on an injection molding machine to give 2 mm injection molded sheets. The product had a Shore hardness of Shore 95A.

Example 6

A polyether-TPU as described in example 5 and a polyester-TPU as described in example 3 were prepared and were stabilized with stabilizers (antioxidant=Irganox® 1125, UV absorber=Tinuvin® 571) according to table 3. After processing to give injection molded sheets, the yellowness index of the samples was analyzed. It was found that the samples comprising Tinuvin® 622, which had a low titanium content after purification according to example 2, had a substantially better initial color than the samples comprising the commercial, unpurified product.

TABLE 3

| Sample | TPU | Antioxidant | Absorber | Tinuvin® 622 | Titanium content Tinuvin® 622 | Yellowness index |
|---|---|---|---|---|---|---|
| 6-1 | Ether | 1% | 0.5% | 0.5% | 111 ppm | 5.5 |
| 6-2 | Ether | 1% | 0.5% | 0.5% | 2.3 ppm | 3.5 |
| 6-3 | Ester | 0.5% | 0.5% | 0.5% | 111 ppm | 6.4 |
| 6-4 | Ester | 0.5% | 0.5% | 0.5% | 2.3 ppm | 5.5 |

We claim:

1. A thermoplastic polyurethane, comprising:
sterically hindered, esterified amine (I) which contains less than 100 ppm of titanium, based on the weight of (I),
wherein the following compound is present as (I) in the polyurethane:

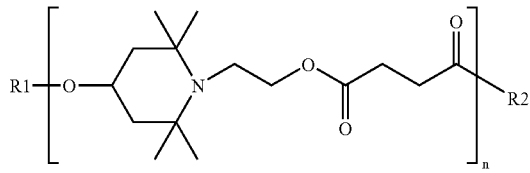

wherein
n is an integer from 1 to 100,
R1 is a hydrogen atom or straight-chain, branched or cyclic alkyl of 1 to 12 carbon atoms, and
R2 is a hydrogen atom or straight-chain, branched or cyclic alkyl of 1 to 12 carbon atoms or is R1 or O—R1 or $N(R1)_2$ and wherein the thermoplastic polyurethane has a total content of less than 100 ppm of titanium, based on the weight of (I).

2. The thermoplastic polyurethane according to claim 1, wherein the sterically hindered, esterified amine is present in the thermoplastic polyurethane in a concentration of from 0.1 to 5% by weight, based on the total weight of the thermoplastic polyurethane.

3. The thermoplastic polyurethane according to claim 1, wherein the plastic comprises a phenolic stabilizer (II).

4. The thermoplastic polyurethane according to claim 3, wherein the plastic comprises, as the phenolic stabilizer (II), at least one of the following compounds:

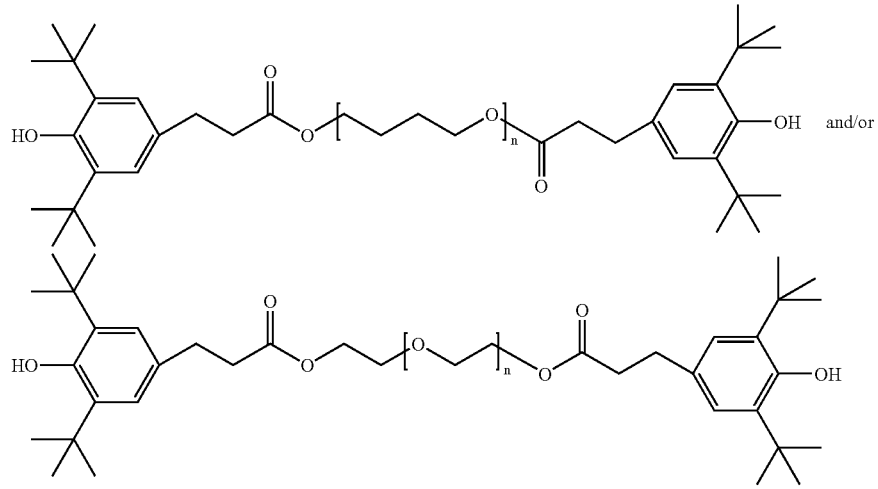

in each case having the following meanings for n: 1-30.

5. The thermoplastic polyurethane according to claim 3, wherein the phenolic stabilizer (II) is present in the polyurethane in a concentration of from 0.1 to 5% by weight, based on the total weight of the polyurethane.

6. The thermoplastic polyurethane according to claim 1, wherein the polyurethane comprises benzotriazole (III).

7. The thermoplastic polyurethane according to claim 6, wherein the plastic comprises, as (III), at least one compound selected from the group consisting of: Tinuvin® P (CAS Reg. No. 2440-22-4), Tinuvin® 329 (CAS Reg. No. 3147-75-9), Tinuvin® 326 (CAS Reg. No. 3896-11-5), Tinuvin® 320 (CAS Reg. No. 3846-71-7), Tinuvin® 571 (CAS Reg. No. 23328-53-2), Tinuvin® 328 (CAS Reg. No. 25973-55-1), Tinuvin® 350 (CAS Reg. No. 36437-37-3, Tinuvin® 327 (CAS Reg. No. 3864-99-1), Tinuvin® 234 (CAS Reg. No. 7032 1-86-7), Tinuvin® 360 (GAS Reg. No. 103597-45-1), Tinuvin® 840 (GAS Reg. No. 84268-08-6), C7-9 branched and linear alkyl ester of 4-hydroxy-3-(2H-benzotriazol-2-yl)-5-(1,1-dimethylethyl)phenylpropanoic acid (GAS No. 1275 19-17-9), Tinuvin® 384, Tinuvin® 213 (mixture of 3 substances with GAS No. 104810-48-2, 10481047-1, 25322-68-3).

8. The thermoplastic polyurethane according to claim 6, wherein the benzotriazole (III) is present in the plastic in a concentration of from 0.01 to 2% by weight, based on the total weight of the plastic.

9. A process for the preparation of a polyurethane comprising a sterically hindered. esterified amine (I), said process, comprising:
adding said sterically hindered, esterified amine (I) to a polyurethane during or after the preparation of said polyurethane,
wherein said sterically hindered esterified amine (I) contains less than 100 ppm of titanium, based on the weight of (I).

10. A film, shoe sole, roller, fiber, cladding in automobiles, wiper blade, hose, cable plug, bellows, trailing cable, cable sheath, seal, belt or damping element based on a thermoplastic polyurethane comprising sterically hindered, esterified amine (I) which contains less than 100 ppm, based on the weight of (I), of titanium, the thermoplastic polyurethane having a total content of less than 100 ppm of titanium, based on the weight of (I).

11. The process according to claim 9, wherein said polyurethane is a thermoplastic polyurethane.

12. The thermoplastic polyurethane according to claim 1, wherein said sterically hindered esterified amine (I) has a content of titanium of <30 ppm, based on the weight of (I).

13. The thermoplastic polyurethane according to claim 1, wherein said sterically hindered esterified amine (I) has a content of titanium of <5 ppm, based on the weight of (I).

14. The thermoplastic polyurethane according to claim 1, further comprising a phenolic stabilizer (II) having a molar mass of from >350 g/mol to <10000 g/mol.

15. The process according to claim 9, wherein said sterically hindered esterified amine (I) has a content of titanium of <30 ppm, based on the weight of (I).

16. The process according to claim 9, wherein said sterically hindered esterified amine (I) has a content of titanium of <5 ppm, based on the weight of (I).

17. The process according to claim 9, wherein said polyurethane further comprises a phenolic stabilizer (II) having a molar mass of from >350 g/mol to <10000 g/mol.

18. The process according to claim 9, wherein said sterically hindered esterified amine (I) has the following formula:

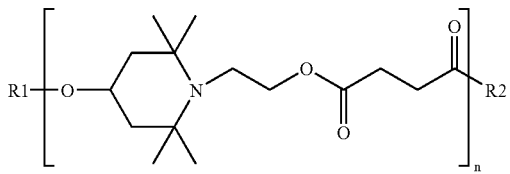

wherein n is an integer from 1 to 100,

R1 is a hydrogen atom or straight-chain, branched or cyclic alkyl of 1 to 12 carbon atoms, and R2 is a hydrogen atom or straight-chain, branched or cyclic alkyl of 1 to 12 carbon atoms or is R1 or O—R1 or N(R1)$_2$

19. The film, shoe sole, roller, fiber, cladding in automobiles, wiper blade, hose, cable plug, bellows, trailing cable, cable sheath, seal, belt or damping element according to claim 10, wherein said sterically hindered esterified amine (I) has the following formula:

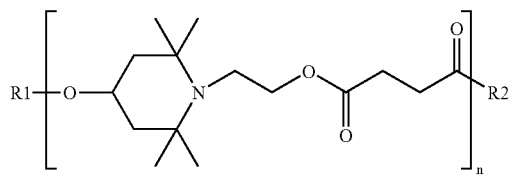

wherein n is an integer from 1 to 100,

R1 is a hydrogen atom or straight-chain, branched or cyclic alkyl of 1 to 12 carbon atoms, and R2 is a hydrogen atom or straight-chain, branched or cyclic alkyl of 1 to 12 carbon atoms or is R1 or O—R1 or N(R1)$_2$.

20. The process according to claim 9, wherein said thermoplastic polyurethane has a total content of less than 100 ppm of titanium.

* * * * *